Oct. 6, 1925.
T. C. KASEBERG
1,555,985
CLUTCH AND BRAKE STRUCTURE
Filed Feb. 14, 1925
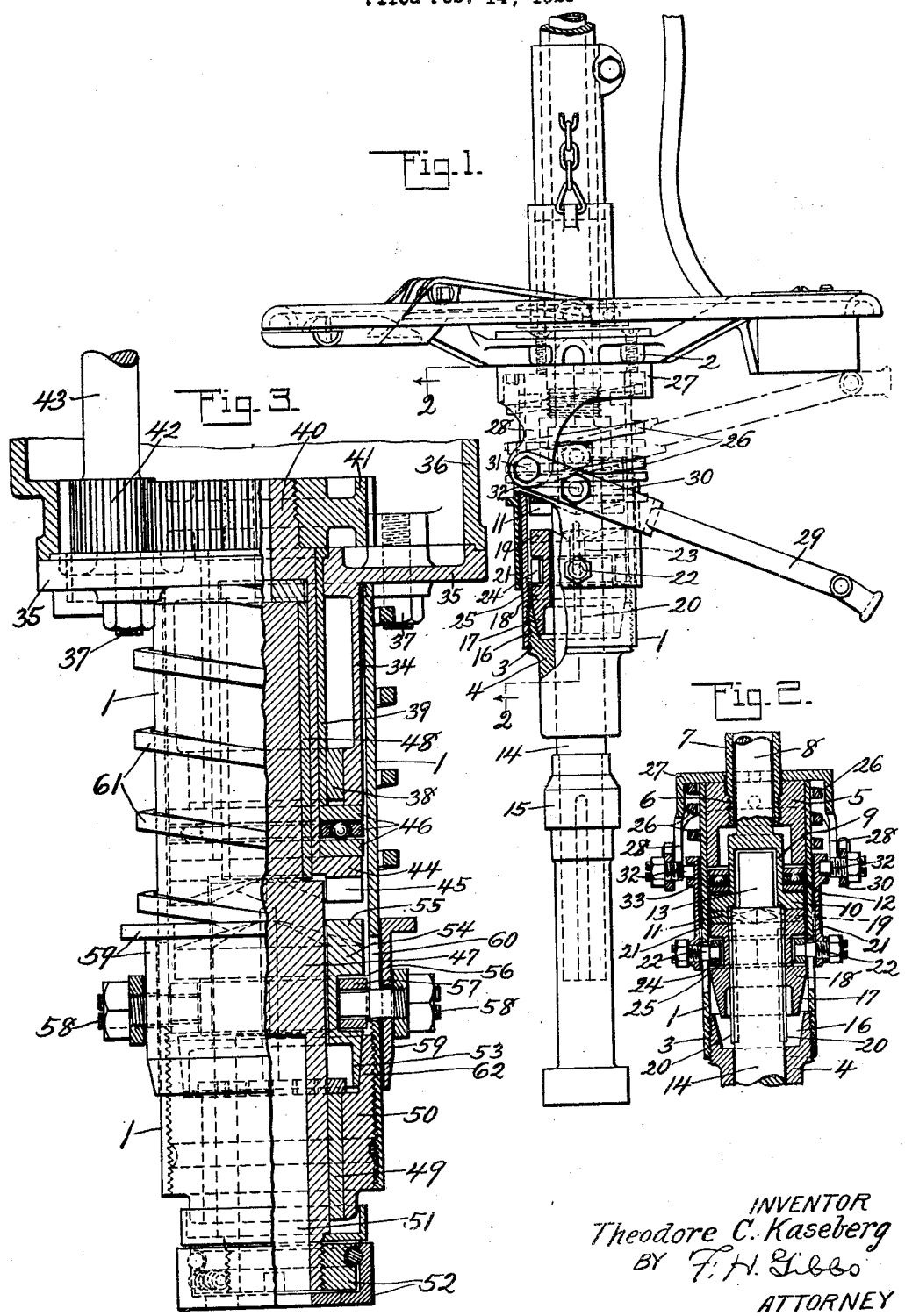
INVENTOR
Theodore C. Kaseberg
BY F. H. Gibbs
ATTORNEY Patented Oct. 6, 1925.

1,555,985

UNITED STATES PATENT OFFICE.

THEODORE C. KASEBERG, OF GRANITE CITY, ILLINOIS, ASSIGNOR TO AMERICAN CAR AND FOUNDRY COMPANY, OF NEW YORK, N. Y., A CORPORATION OF NEW JERSEY.

CLUTCH AND BRAKE STRUCTURE.

Application filed February 14, 1925. Serial No. 9,266.

*To all whom it may concern:*

Be it known that I, THEODORE C. KASEBERG, residing at Granite City, Illinois, and being a citizen of the United States, have invented certain new and useful Improvements in a Clutch and Brake Structure; of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a view showing the improved clutch principally in side elevation and partially broken away in longitudinal section;

Fig. 2 is a longitudinal sectional view taken along the line 2—2 of Fig. 1; and

Fig. 3 is an enlarged view partially in longitudinal section and showing a modified form of clutch.

An object of this invention is to provide an improved clutch for use in connection with a reamer drive, the clutch being so constructed that when moved to an inoperative position to release the driven element from the driving element, a brake may be applied and rotation of the driven element checked.

Another object of the invention is to so construct this device that the clutch sleeve or movable clutch element may be readily moved into position for causing rotation of the driven element with the driving element but may be normally held in a brake applying position by spring means which will return it to the brake applying position when the movable clutch element is moved out of position for causing rotation of the driven element. This insures movement of the clutch sleeve to the brake applying position and will cause the driven element to be always quickly stopped when the movable clutch element is moved out of position for causing rotation of the driven element.

Another object of the invention is to so construct this device that the driving element, driven element, and movable clutch element may be positioned in a casing, which will protect them from exposure and also serve to retain them in the proper relation to each other.

This improved attachment is provided with a cylindrical casing or sleeve 1 which will be rigidly connected with a stationary support 2 which may be a portion of a motor casing or any suitable portion of the machine with which the attachment is used. This casing 1 is of an even diameter throughout its length and has its outer end portion internally threaded as shown at 3 so that the stationary brake or clutch member 4 may be screwed into the outer end portion of this stationary casing. In the rear or inner end portion of the casing there is provided a bushing or sleeve 5 which fits snugly in the casing and is held stationary therein by any suitable means. This bushing or filler is provided with an axially disposed passage 6 which is threaded as shown in Fig. 2 so that this bushing may be screwed onto the threaded end portion of the tube 7 in which rotates the driving element 8. This driving element 8 may be a portion of the drive shaft of an operating motor or may be a separate shaft which will be connected with the drive shaft of an operating motor in any desired manner. The forward end portion of this drive shaft 8 is enlarged and hollowed out to provide a socket 9 and is provided with an annular collar 10 upon which are provided clutch teeth 11. A bearing 12 is provided about this socket 9 between the collar 10 and forward end of the bushing 5 so that the driving shaft will be permitted to rotate freely in the casing. From an inspection of Fig. 2 it will be seen that the socket 9 receives the reduced end portion 13 of the shank 14 which extends through the stationary clutch or brake member 4 and together with the socket portion 15 forms a chuck for carrying a reamer tool. The opening in the stationary brake member 4 is for the major portion of its length of a size to snugly receive the shank 14 of the chuck but has its inner end portion enlarged to provide a tapered socket 16 for receiving the tapered forward end portion 17 of the movable clutch member 18. This movable clutch member 18 is in the form of a sleeve or block which is positioned in the casing 1 between the forward end of the driving element and the inner end of the stationary brake member 4. Its rear end portion is provided with clutch teeth 19 for gripping engagement with the clutch teeth 11 of the driving element and since this movable clutch member is keyed to the driven element or chuck by means of keys 20 it it will be readily seen that when the movable clutch element is moved rearwardly into engagement with the teeth of the driving element rotary movement will be imparted to the driven element or chuck. In order to move the movable clutch member 18 longitudinally in the casing there has been provided a sleeve 21 which slidably fits upon the casing and carries pins 22 which extend through slots 23 formed longitudinally in the casing and fit into sockets provided in a ring or collar 24 which fits loosely in a circumferentially disposed groove or seat 25 formed in the clutch member 18 intermediate its length. The sleeve 21 is to be normally held projected forwardly so that the tapered end 17 of the movable clutch 18 will be wedged tightly in the tapered socket 16 of the stationary brake member 4 and therefore there has been provided a coiled spring 26 which is disposed about the casing 1 with its forward end engaging the rear end of the sleeve 21 and its rear end abutting against a suitable abutment such as the body portion of the bracket 27. This bracket 27 is mounted upon the tube 7 between the support 2 and the rear end of the casing 1 and is provided with arms 28 which extend forwardly upon opposite sides of the casing. An operating lever 29 is made use of and at its lower end is provided with forks 30 which are pivotally connected with the arms 28 by bolts or other similar fasteners 31 and carry pins 32 which project inwardly from the forks and fit into the annular groove or seat 33 provided at the rear end of the sleeve 21. It will therefore be seen that although the sleeve is normally held in a forwardly project position it may be moved rearwardly against the action of the spring 26 by means of the lever 29 and when so moved the clutch teeth 19 of the movable clutch 18 will be moved into engagement with the clutch teeth 11 of the driving element. The driving element will then transmit rotary movement to the driven element through the medium of the movable clutch until the lever is again moved to a releasing position. When the lever is moved forwardly towards a releasing position the teeth will be disengaged and the spring will force the sleeve forwardly so that the movable clutch element has its tapered forward end forced tightly into the socket 16. This will cause a brake action to be applied and the driven element or chuck will be quickly brought to a stop. It will therefore be seen that with this arrangement the driven element will not continue to rotate for a comparatively long time after the movable clutch has been moved out of engagement with the driving element.

In the form shown in Fig. 3 the construction is broadly similar to that shown in Fig. 2 but the details of construction are somewhat different. In this form the sleeve or casing 1 fits about an inner sleeve or collar 34 which is carried by an attaching plate or flange 35 which will be secured to the motor casing 36 by suitable fasteners such as shown at 37. Any suitable means desired may be made use of to prevent rotation of the casing 1 upon the sleeve 34. The forward end portion of the sleeve 34 carries a bearing ring 38 and within this ring fits the forward end portion of a bushing 39 which is disposed longitudinally of the casing and has its rear end portion fitting in an opening provided in the flange or base plate 35. The driving element 40 is in the form of a hollow shaft which rotatably fits in the bushing 39 and has its rear end portion projecting into the motor casing. This rear end portion may be directly connected with a drive shaft of a motor or it may carry a gear 41 which meshes with a gear 42 carried by the motor shaft 43. At its forward end the driving shaft 40 is provided with an outstanding collar or shoulder 44 which corresponds to the shoulder or collar 10 and carries clutch teeth 45, a bearing 46 being provided between this shoulder 44 and the forward end of the sleeve 34 and bushing 39 so that the driving element may rotate freely in the casing.

The driven element or chuck 47 which takes the place of the chuck 15 fits almost entirely within the casing and has its rear end portion or shank rotatably fitting within the bushing 48 disposed in the hollow driving element 40. The forward end portion of the chuck projects through a bushing 49 mounted in the stationary clutch or brake member 50 corresponding to the stationary clutch 4 and screwed into the forward end portion of the casing 1. This forward end portion of the chuck is provided with a socket 51 to receive the cutting tool and has its extreme forward end projecting beyond the forward end of the stationary clutch or brake member 50 and carrying fastener means 52 by means of which a cutting tool may be firmly secured in the socket 51. The rear end portion of the stationary clutch 50 is provided with a tapered socket 62 which corresponds to the socket 16 and receives the tapered forward end 53 of the movable clutch member 54. This clutch member 54 is similar to the movable clutch member 18 and is provided at its rear end with teeth 55 for engagement with the teeth 45 of the drive shaft. Intermediate its length the movable clutch member is provided with an annular groove 56 in which is loosely mounted a ring 57 corresponding to the ring 24 and this ring 57 is provided with sockets receiving pins 58 carried by the sleeve 59 and projecting inwardly through slots 60 provided longitudinally in opposite side portions of the casing 1. A spring 61 which corresponds to the spring 26 is provided about the casing 1 with its rear end engaging the base plate 35 and its forward end engaging the sleeve 59 so that the sleeve will be normally held projected forwardly with the movable clutch wedged into the tapered socket of the stationary clutch member. Means similar to that shown in Figs. 1 and 2 may be provided for moving the sleeve 59 rearwardly to move the movable clutch member into engagement with the driving element or any other suitable means may be made use of. The operation of this modified form is the same as in the form shown in Figs. 1 and 2 and will be readily understood.

What is claimed is:

1. In a clutch and brake structure, a casing, a drive shaft extending into said casing through one end and rotating therein, a socket extending into said casing through its other end and rotating therein, a stationary brake member in said casing about said socket, and a collar slidable upon said socket between the stationary brake member and inner end of said drive shaft and held against rotation upon said socket, one end of said collar having a grip portion for engaging said stationary brake member and checking rotation of said socket when the collar is moved longitudinally upon the socket in one direction, the other end of said collar and the inner end of said drive shaft having cooperating clutch portions engaging when the collar is moved in a direction opposite to its first movement and causing rotation of the socket with the drive shaft.

2. In a clutch and brake structure, a casing, a drive element extending into said casing through one end and rotating therein, a driven element extending into said casing through its other end and rotating therein, a stationary brake member in said casing, and a collar keyed to said driven element for movement longitudinally thereon within said casing between the stationary brake member and inner end of said drive element, the inner end of said drive element and one end of said collar having clutch elements locking the collar to the drive element to impart rotary movement to the driven element when the collar is moved into engagement with the drive element, the other end of the collar having means for engaging the stationary brake member and checking rotation of the driven element when the collar is moved away from the drive element.

3. In a clutch and brake structure, a casing, a drive shaft rotating in one end portion of said casing, a driven element rotating in the other end portion of said casing, a stationary brake member in said casing about said driven element, and a clutch and brake collar slidable along said driven member between said brake member and the inner end of said drive shaft, one end of said collar being adapted for gripping engagement with said stationary brake member and the other end of the collar being adapted for clutching engagement with the inner end of said drive shaft.

4. In a clutch and brake structure, a casing, a drive shaft rotating in one end portion of said casing, a driven element rotating in the other end portion of said casing and having telescoping engagement with said drive shaft, a stationary sleeve in said casing about said driven element and having a tapered pocket leading from its inner end, and a collar slidable along said driven element and having one end tapered for wedging fit in the pocket of said sleeve for checking rotation of said driven element, the other end of said collar and the inner end of said drive shaft having clutch teeth for interlocking and causing rotation of the collar and driven element when the collar is moved out of engagement with said sleeve and into engagement with the drive shaft.

5. In a clutch and brake structure, a tubular casing, a bearing sleeve in one end portion of said casing, a drive shaft extending into said casing through said bearing sleeve and rotating therein and at its inner end provided with an outstanding flange having clutch teeth provided thereon, a rotating driven element extending into the casing from its other end, a brake sleeve stationary in said casing about said driven element and having a tapered pocket leading from its inner end, and a collar slidable upon said driven element within the casing and having one end provided with clutch teeth for interlocking with the clutch teeth of said driven shaft and its other end tapered for tight wedging fit within the tapered pocket of said brake sleeve.

6. In a clutch and brake structure, a tubular casing, a bearing sleeve in one end portion of said casing, a drive shaft extending into said casing through said bearing sleeve and rotating therein and at its inner end provided with an outstanding flange having clutch teeth provided thereon, a rotating driven element extending into the casing from its other end, a brake sleeve stationary in said casing about said driven element, and a collar slidable upon said driven element between the brake sleeve and driven shaft and having clutch teeth at one end for engaging the teeth of said drive shaft and its other end adapted for gripping engagement with the brake sleeve.

7. In a clutch and brake structure, a tubular casing, a bearing sleeve in one end portion of said casing, a drive shaft rotating in said sleeve and having an axially disposed pocket leading from its inner end, a stationary brake sleeve in the other end of said casing and constituting a bearing, a rotating driven element extending into said casing and journaled in said brake sleeve and having its inner end portion rotating in the pocket of said drive shaft, and a collar keyed to said driven element for sliding longitudinally thereon between the brake sleeve and drive shaft and having one end adapted for clutching engagement with the inner end of the drive shaft and its other end adapted for gripping engagement with the brake sleeve.

8. In a clutch and brake structure, a tubular casing, a bearing sleeve in one end portion of said casing, a drive shaft rotating in said sleeve and having an axially disposed pocket leading from its inner end, a stationary brake sleeve in the other end of said casing and constituting a bearing, a rotating driven element extending into said casing and journaled in said brake sleeve and having its inner end portion rotating in the pocket of said drive shaft, a collar sliding longitudinally upon said driven element between said brake sleeve and the inner end of said drive shaft and held against rotation upon the driven element, a band loosely fitting in an annular external groove formed in said collar and having sockets registering with longitudinally disposed slots in said casing, and a sleeve slidable upon said casing and having openings registering with said slots whereby portions of an operating element may extend through the openings and slots and engage in the sockets of said band for imparting sliding movement to the collar and selectively move the collar into gripping engagement with the brake sleeve or clutching engagement with the inner end of said drive shaft.

9. In a clutch and brake structure, a tubular casing, a drive shaft rotating in one end portion of said casing and having clutch means at its inner end, a driven shaft rotating in the other end portion of said casing, a stationary brake member in the end portion of said casing receiving said driven shaft, and a clutch and brake member slidable upon said driven shaft and having a portion for gripping engagement with said stationary brake member when moved in one direction to an operative position and a portion for clutching engagement with the clutch means of said drive shaft when moved in an opposite direction to an operative position.

In witness whereof I have hereunto set my hand.

THEODORE C. KASEBERG.